United States Patent [19]

Dick et al.

[11] Patent Number: 4,860,612

[45] Date of Patent: Aug. 29, 1989

[54] VEHICLE TORQUE TRANSFER CASE FOR A FOUR WHEEL DRIVE SYSTEM

[75] Inventors: Wesley M. Dick; David C. Reuter, both of Fort Wayne, all of Ind.

[73] Assignee: Dana Corporation, Toledo, Ohio

[21] Appl. No.: 89,283

[22] Filed: Aug. 25, 1987

Related U.S. Application Data

[63] Continuation-in-part of Ser. No. 718,748, Apr. 1, 1985, Pat. No. 4,688,447.

[51] Int. Cl.⁴ .............................................. F16H 37/08
[52] U.S. Cl. .............................. 74/665 H; 74/665 T; 74/467; 74/714; 180/247
[58] Field of Search ........ 74/66 ST, 66 SH, 66 SGA, 74/66 SS, 69 S, 710.5, 711, 714, 467; 180/233, 247, 249, 248

[56] References Cited

U.S. PATENT DOCUMENTS

| | | | |
|---|---|---|---|
| 2,185,636 | 1/1940 | Kysor | 180/249 |
| 2,195,479 | 4/1940 | Buchner | 74/700 |
| 2,223,522 | 12/1940 | Kysor | 74/665 H |
| 2,762,233 | 9/1956 | Orr | 74/467 |
| 3,095,758 | 7/1963 | Bixby | 74/701 |
| 3,262,512 | 7/1966 | O'Brien | 180/245 |
| 3,583,526 | 6/1971 | Mulleder | 74/467 X |
| 3,650,349 | 3/1972 | Cleveland | 180/249 |
| 3,656,573 | 4/1972 | Halberg | 74/711 X |
| 3,748,928 | 7/1973 | Shiber | 74/711 |
| 3,828,877 | 8/1974 | Fogelberg | 180/249 X |
| 4,074,591 | 2/1978 | Dick | 74/714 |
| 4,147,225 | 3/1979 | Mazziotti | 74/665 H X |
| 4,231,266 | 11/1980 | Nishikawa et al. | 74/467 |
| 4,242,923 | 1/1981 | Nishikawa et al. | 74/467 X |
| 4,270,409 | 6/1981 | Glaze et al. | 180/247 X |
| 4,289,213 | 9/1981 | Seaman | 74/665 H X |
| 4,417,641 | 11/1983 | Kageyama | 180/247 |
| 4,688,447 | 8/1987 | Dick | 74/665 T |

FOREIGN PATENT DOCUMENTS

| | | | |
|---|---|---|---|
| 0205066 | 11/1984 | Japan | 74/467 |
| 1200047 | 12/1985 | U.S.S.R. | 74/467 |

Primary Examiner—Dwight G. Diehl
Attorney, Agent, or Firm—MacMillan, Sobanski & Todd

[57] ABSTRACT

A four wheel drive transfer case transmits power from the output of a vehicle transmission to front and rear differential assemblies. The transfer case includes an input shaft coupled to the output shaft of the vehicle transmission, and an interaxle planetary gear differential for dividing power between a rear output shaft connected to the vehicle rear differential and a front output shaft connected to the vehicle front differential. An electromagnetic friction clutch is located in the transfer case and is adapted to selectively lock the planetary gear differential to prevent slip between the front and rear output shafts. An electronic control is operative to selectively engage the electromagnetic clutch to lock the differential for a predetermined time period when a predetermined amount of slip is detected between the front and rear output shafts. In accordance with the present invention, a cross-axised gearing arrangement is utilized to provide an angled front output shaft which has a rotational axis oriented in non-parallel, non-intersecting relationship with the rotational axis of the rear output shaft. This arrangement provides a substantially straight line connection between the transfer case and the vehicle rear differential, and between the transfer case and the vehicle front differential. Also, a unique lubrication system is provided for supplying lubricating oil to the upper components of the transfer case.

19 Claims, 4 Drawing Sheets

VEHICLE TORQUE TRANSFER CASE FOR A FOUR WHEEL DRIVE SYSTEM

CROSS REFERENCE TO RELATED APPLICATION

This application is a continuation-in-part of copending U.S Pat. application Ser. No. 718,748, filed April 1, 1985, now U.S. Pat. No. 4,688,447 and entitled VEHICLE TORQUE TRANSFER GEAR ASSEMBLY HAVING DIFFERENT ANGLED OUTPUT SHAFTS.

BACKGROUND OF THE INVENTION

The present invention relates generally to a vehicle four wheel drive transfer case and, in particular, to a four wheel drive transfer case which includes an angled front output shaft for connection to an input shaft of a front differential.

Four wheel drive systems for vehicles are becoming increasingly common. In the past, such systems typically included a transfer case connected to the output of a vehicle transmission which was provided with selective control means operable by the vehicle driver for selecting whether the vehicle is to be operated in either a two wheel or four wheel drive mode. Recently, certain vehicles have been provided with a "full time" four wheel drive system. In these systems, the transfer cases are typically provided with an inter axle differential for dividing torque between the vehicle front and rear differentials. Also, in order to prevent excessive slipping between the front and rear wheels, these transfer cases typically include a selectively engageable clutch means which is operative to lock the inter axle differential upon sensing a predetermined slippage between the front and rear output shafts of the transfer case.

In some vehicles, it can be difficult to locate the transfer case in such a manner to provide the efficient transfer of torque to the front and rear differentials, while maintaining sufficient vehicle ground clearance.

SUMMARY OF THE INVENTION

The present invention is directed to a four wheel drive system which, in the preferred embodiment, enables a substantially straight line connection between a transfer case and a vehicle rear differential and between the transfer case and a vehicle front differential. In particular, the four wheel drive system utilizes a unique torque transfer case which includes a torque input shaft for receiving output torque from the vehicle transmission, a front output shaft adapted to be connected to the vehicle front differential, and a rear output shaft adapted to be connected to the vehicle rear differential. In the preferred embodiment of the invention, a planetary gear differential is utilized to divide torque between the front and rear output shafts. Also, an electromagnetic clutch is provided for selectively locking the planetary gear differential in the event a predetermined slippage is detected between the front and rear output shafts.

The transfer case is positioned within the vehicle such that the input shaft to the vehicle rear differential is located lower than the rear output shaft of the transfer case. A rear drive shaft is connected between the rear output shaft of the transfer case and the rear differential input shaft and is angled downwardly from the transfer case to the rear differential. The transfer case and the rear differential are oriented relative to one another such that, when the vehicle is loaded with a predetermined weight, the angle between the rear drive shaft and the rear output shaft of the transfer case is substantially equal to the angle between the rear drive shaft and the rear input shaft of the rear differential. This balances the load on the universal joint assemblies located at the ends of the rear drive shaft. Preferably, the rear output shaft, the rear drive shaft, and the rear input shaft are coaxial with one another to establish a substantially straight line drive connection.

Further, the front differential of the vehicle includes an input shaft which is connected to the front output shaft of the transfer case by a front drive shaft. In accordance with the present invention, the front output shaft and the front input shaft are oriented relative to one another such that, when the vehicle is loaded with the predetermined weight, the angle between the front drive shaft and the front output shaft of the transfer case is substantially equal to the angle between the front drive shaft and the front input shaft of the front differential. Preferably, the front output shaft, the front drive shaft, and the front input shaft are coaxial with one another to establish a substantially straight line drive connection. In order to achieve such a drive system, the front output shaft of the torque transfer unit is angled relative to the rear output shaft and has a rotational axis which is oriented in non-parallel, non-intersecting relationship with the rotational axis of the rear output shaft. The angled front output shaft is achieved by means of a cross-axised gearing arrangement.

The present invention also includes a unique lubrication system for supplying lubricating oil to upper components of the transfer case which are located above the normal level of lubricating oil in the transfer case. In particular, a first output gear is rotatably supported within the housing and is partially immersed in lubricating oil. When rotating, the first output gear is adapted to throw lubricating oil against an upper front surface portion of the housing. A first rib member, which is located on the upper front surface portion and is angled downwardly toward the front of the transfer case, is adapted to direct lubricating oil into an auxiliary front reservoir. From the front reservoir, oil is supplied to lubricate certain upper front components of the transfer case. A second rib member is located on the upper inside rear surface of the housing to direct oil into an auxiliary rear reservoir, from which oil is supplied to lubricate certain upper rear components.

The above, as well as other advantages of the present invention, will become readily apparent to one skilled in the art from reading the following detailed description in conjunction with the attached drawings.

DESCRIPTION OF THE PREFERRED EMBODIMENT

Figure 1:
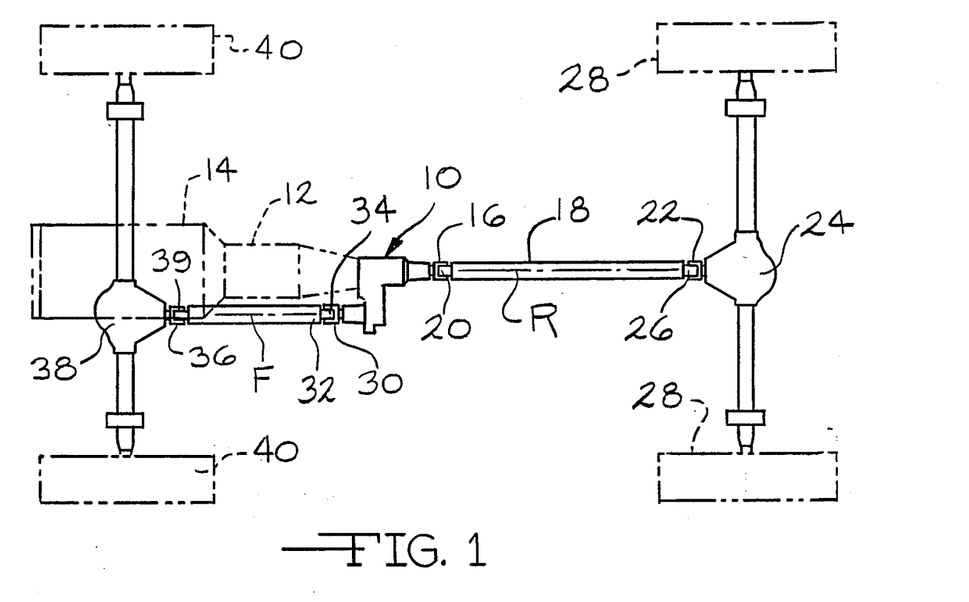
FIG. 1 is a top plan view of a four wheel drive system which utilizes the transfer case of the present invention so as to provide a substantially straight line drive connection to both the front and rear differentials of the vehicle.
Figure 2:
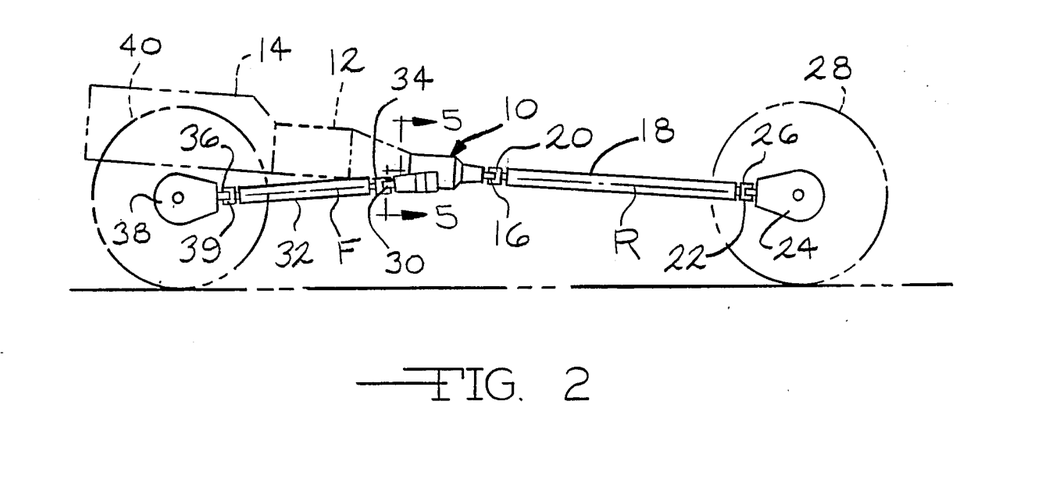
FIG. 2 is a side elevational view of FIG. 1, illustrating the angled relationship between the front and rear drive shafts.

Referring first to FIGS. 1 and 2, there is shown a vehicle four wheel drive system which utilizes the transfer case of the present invention. As shown in FIGS. 1 and 2, a transfer case 10 is secured to the rear of a transmission unit 12 (shown in phantom) which in turn is coupled to a drive engine 14 (also shown in phantom). As will be discussed, the transmission 12 is provided with an output shaft which is coupled to an input shaft of the transfer case 10. The transfer case 10 includes a rear output shaft or yoke 16 connected to the forward end of a rear drive shaft 18 by means of a conventional universal joint coupling 20. The rearward end of the drive shaft 18 is coupled to an input shaft or yoke 22 of a rear differential 24 by means of a universal joint coupling 26. The rear differential 24 is adapted to divide torque from the drive shaft 18 between the rear wheels 28.

The transfer case 10 is provided with a front output shaft or yoke 30 which is connected to the rearward end of a front drive shaft 32 by means of a universal joint coupling 34. The front drive shaft 32 has a forward end connected to an input shaft or yoke 36 of a front differential unit 38 by means of a universal joint coupling 39 and is adapted to divide torque received from the drive shaft 32 between the vehicle front wheels 40.

As shown in FIGS. 1 and 2, the rear drive shaft 18 is adapted to rotate about an axis R, while the front drive shaft 32 is adapted to rotate about an axis F. In the preferred embodiment of the invention as illustrated in FIGS. 1 and 2, the rear drive shaft 18 is angled downwardly from the transfer case 10 to the rear differential 24, while the front drive shaft 32 is angled downwardly from the transfer case 10 to the front differential 38. As will be discussed, preferably, the rear output shaft 16 of the transfer case 10, the rear drive shaft 18, and the input shaft 22 to the rear differential 24, are all in a substantially straight line relationship along the axis R. Also, the front output shaft 30 of the transfer case 10, the front drive shaft 32, and the input shaft 36 to the front differential 38 are also in a substantially straight line relationship along the front axis F. Further, in the preferred embodiment, the axes R and F are located in spaced apart, vertically oriented parallel planes. As will be discussed, in order to accomplish this drive arrangement, the front output shaft 30 must be laterally spaced from and angled relative to the rear output shaft 16, as shown in FIG. 2, such that the axis of the front output shaft 30 is non-parallel and non-intersecting with the axis of the rear output shaft 16. This angular connection is accomplished by way of a cross-axised gearing arrangement.

Figure 3:
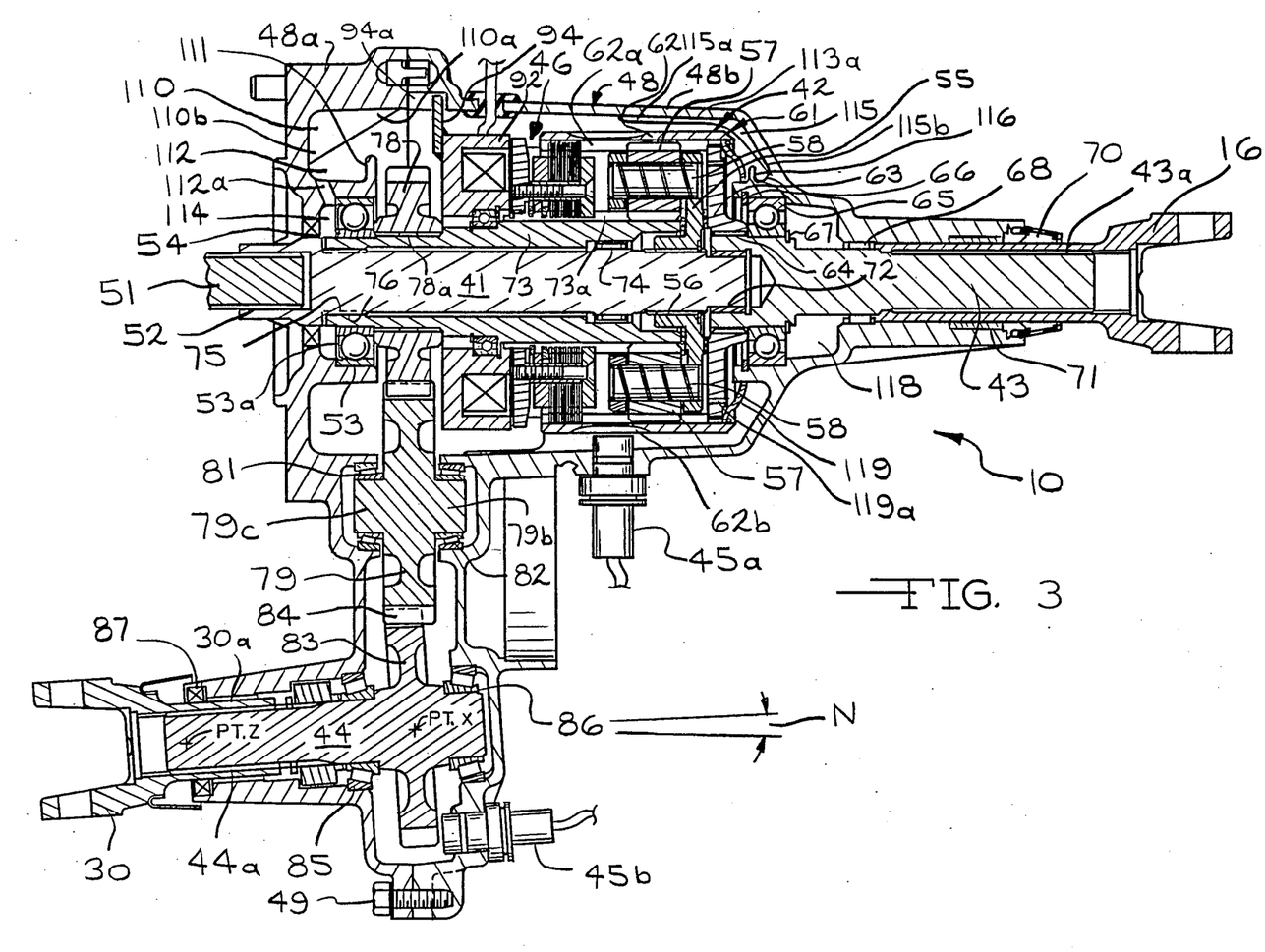
FIG. 3 is a sectional view through the transfer case assembly taken generally along the line 3—3 of FIG. 5 and illustrating the cross axised gearing connection to the angled front output shaft of the transfer case.
Figure 4:
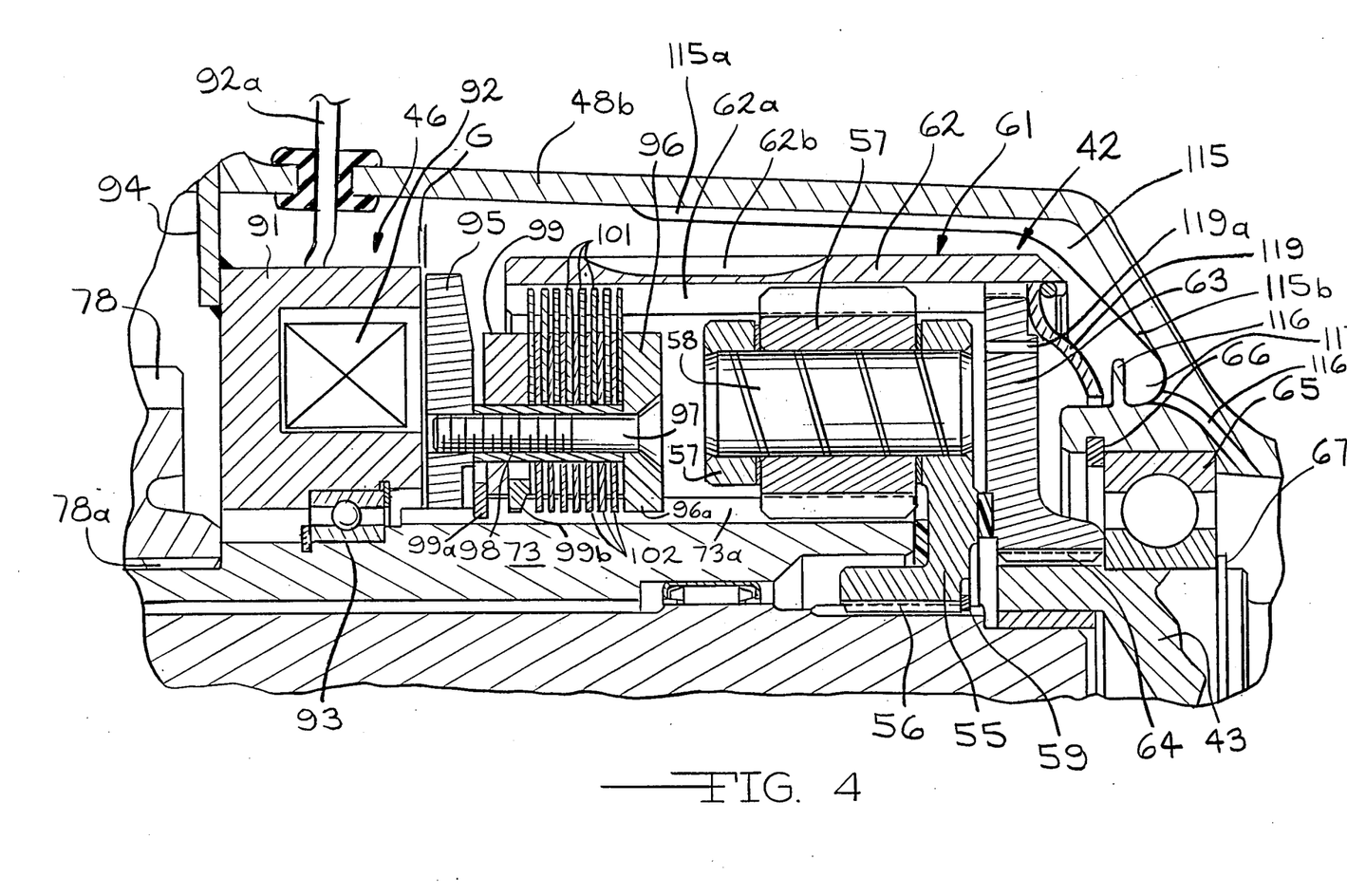
FIG. 4 is an enlargement of the portion of FIG. 3 illustrating the electromagnetic clutch and the planetary gear differential.
Figure 5:
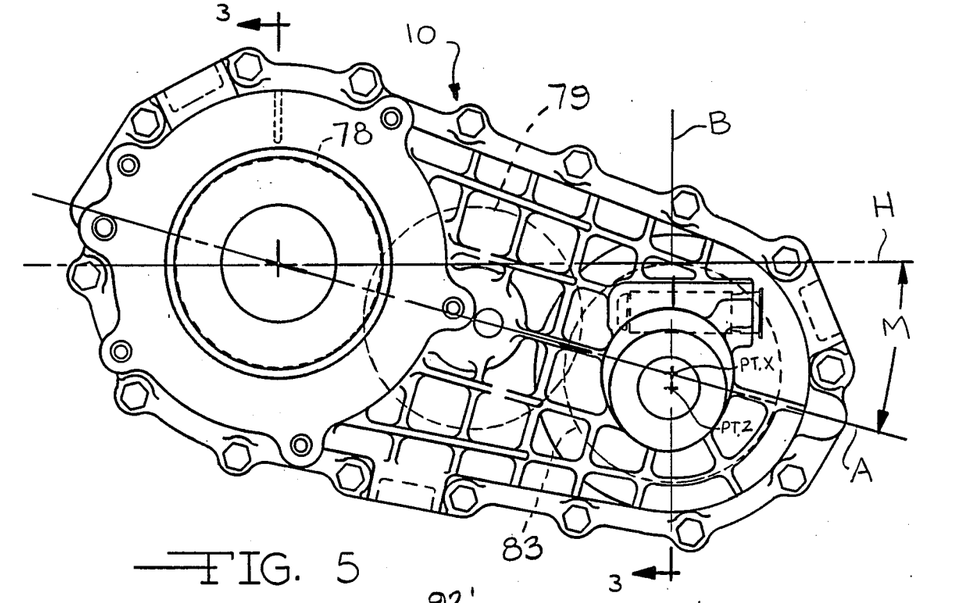
FIG. 5 is a front elevational view of the transfer case taken along the line 5—5 of FIG. 2.

Referring now to FIGS. 3, 4, and 5, the specific construction of the transfer case 10 will now be discussed in more detail. Briefly, as shown in FIG. 3, the transfer case 10 includes an input shaft 41 for receiving output torque from the vehicle transmission, and a planetary gear differential, generally indicated by reference numeral 42, for dividing torque between a rear output shaft 43 and a front output shaft 44. The speed of the rear output shaft is monitored by a speed sensor 45a, while the speed of the front output shaft is monitored by a speed sensor 45b. The outputs of the speed sensors 45a and 45b are connected to an electronic control (not shown in FIG. 3) for monitoring the slip between the front and rear output shafts. Normally, a predetermined slippage between the front and rear output shafts is permitted to accommodate slightly different front and rear wheel speeds which occur when turning the vehicle. However, when slippage between the front and rear wheels exceeds a predetermined amount, the electronic control will generate an output signal to an electromagnetic friction clutch, generally indicated by reference numeral 46, which causes the planetary gear differential 42 to lock and provide a direct drive connection between the input shaft 41 and the front and rear output shafts 43 and 44.

More specifically, the transfer case 10 includes an outer housing 48 consisting of a front section 48a and a rear section 48b which are secured together by a plurality of bolts such as a bolt 49. The transfer case input shaft 41 has a forward end connected to the rear end of a transmission output shaft 51 by means of a spline connection at 52, which prevents relative rotation; between the shafts 41 and 51. The forward end of the input shaft 41 is rotatably supported in the housing 48 by means of a ball bearing assembly 53. An annular seal assembly 54 is secured within an opening provided in the front face of the housing section 48a, and sealingly engages an outer annular surface of the input shaft 41.

The input shaft 41 extends into the transfer case housing and has a rearward end which is coupled to a planet carrier 55 of the planet gear differential 42 by means of a spline connection at 56. The spline connection 56 prevents relative rotation between the input shaft 41 and the planet carrier 55. The planet carrier 55 carries a plurality of circumferentially spaced apart planet gears 57 each of which are rotatably mounted about a separate shaft 58. As shown in the enlarged view of FIG. 4, a snap ring 59 is secured to the rearward end of the input shaft 41 to limit the axial movement of the planet carrier 55.

The planet gear differential 42 includes a ring gear housing 61 which is utilized to transmit power from the input shaft 41 through the planet gears 57 and to the rear output shaft 43. In particular, the ring gear housing 61 includes a cylindrical sleeve 62 provided with internal ring gear teeth 62a which matingly engage the gear teeth of each of the planet gears 57. The housing 61 includes a circular end plate 63 having an outer periphery secured to the rear end of the sleeve 62 by means of a snap and having an inner end secured to the forward end of the rear output shaft 43 by means of a spline connection indicated at 64. The spline connection 64 prevents any relative rotation between the ring gear housing 61 and the rear output shaft 43. The sleeve 62 also includes an annular array of external teeth 62b which are sensed by the speed sensor 45a for monitoring the speed of the rear output shaft 43.

The rear output shaft 43 is rotatably supported within the rear housing section 48b by means of a ball bearing assembly 65 which is secured relative to the housing by means of a snap ring 66 and is secured relative to the output shaft 43 by means of a snap ring 67. An intermediate portion of the output shaft 43 is rotatably supported relative to the rear housing section 48b by means of a needle bearing assembly 68. The rearward end of the rear output shaft 43 is provided with external splines 43a adapted to receive an internal splined section of the rear output yoke 16. An annular seal assembly 70 is secured within a rear opening provided in the housing section 48b and is adapted to sealingly engage an outer annular surface of the yoke 16. An annular bushing 71 is spaced inwardly from the seal assembly 70 and rotatably supports the yoke 16. Also, an annular bushing 72 is mounted within an annular cavity formed in the forward end of the rear shaft 43 for rotatably supporting the rear end of the input shaft 41.

The planetary gear differential 42 includes a sun gear sleeve 73 which is rotatably supported about the input shaft 41 and is utilized to transmit torque to the front output shaft 44. More specifically, a needle bearing assembly 74 rotatably supports the rearward end of the sleeve 73 about the input shaft 41, while the forward end of the sleeve 73 is provided with an internal annular bearing surface 75 which cooperates with an external annular fluted bearing surface 76 formed on the shaft 41 to enable relative rotation between the sleeve 73 and the input shaft 41. It should be noted that, normally, if there is no slip between the front and rear output shafts of the transfer case, there will be no relative rotation between the sleeve 73 and the input shaft 41.

The rearward end of the sleeve 73 is provided with an annular periphery of external sun gear teeth 73a which matingly engage each of the planet gears 57. The forward end of the sleeve 73 carries a first output gear 78 which is coupled to the sleeve 73 by means of a spline connection at 78a which prevents relative rotation between the sleeve 73 and the gear 78. The first output gear 78 drives an intermediate second output gear 79. The intermediate second output gear 79 has integral shaft portions 79a and 79b which are rotatably supported by a pair of tapered roller bearing assemblies 81 and 82 respectively mounted within annular recessed portions provided in the housing sections 48a and 48b. The intermediate second output gear 79 is adapted to drive a front output gear 83 which is formed integrally with the front output shaft 44. In accordance with the present invention, the front output shaft is formed at a predetermined angle N (shown in FIG. 3) relative to the rear output shaft 43. This is accomplished by providing a cross-axised gearing arrangement at 84. As shown in FIG. 5, when installed on the vehicle, the transfer case is angled downwardly toward the left side of the vehicle by an angle M, which is referenced from a horizontal plane H. In this case, the axis of the first output gear 78, the axis of the intermediate gear 79, and point X (also shown in FIG. 3) of the front output gear 83, will be located in an inclined plane A. In the embodiment shown in FIGS. 3, 4, and 5, the front output shaft 44 is angled within a vertical plane B, as shown in FIG. 5, such that the points X and Z (also shown in FIG. 3) are located in the plane B. The plane B is parallel to the axes of the gears 78 and 79. As shown in FIGS. 3 and 5, the rotational axes of the front output shaft and the rear output shaft do not intersect and do not lie in a common plane and thus cooperate to define skew lines. The cross-axised gear connection at 84 can be obtained by forming the teeth of the gear 83 with a bevel determined by the inclined angle M (shown in FIG. 5), and with a helical configuration determined by the angle N (shown in FIG. 3).

The front output shaft 44 is rotatably supported by means of a pair of tapered roller bearing assemblies 85 and 86 respectively mounted within housing sections 48a and 48b. The forward end of the front output shaft 44 is provided with external splines 44a for receiving internal splines provided on a sleeve portion 30a of the front output yoke 30. An annular seal assembly 87 is secured within an opening provided in the housing section 48a and sealingly engages an outer annular surface of the yoke sleeve 30a.

As previously mentioned, an electromagnetic friction clutch 46 is provided to selectively lock the planetary gear differential 61 when a predetermined amount of wheel slippage is sensed between the front and rear output shafts. In particular, the clutch assembly 46 is adapted to lock the ring gear housing 61 relative to the sun gear sleeve 73 to prevent relative rotation therebetween. In this situation, a direct drive condition exists between the input shaft 41 and the rear output shaft 43 and between the input shaft 41 and the front output shaft 44. When the ring gear housing 61 is locked relative to the sun gear sleeve 73, the planet gears 57 are prevented from rotation about the associated shafts 58, thereby preventing rotation of the planet carrier 55 (which is locked to the input shaft 41) relative to either the ring gear housing 61 or the sun gear sleeve 73.

The electromagnetic clutch 46 is illustrated more clearly in the enlarged view of FIG. 4. As shown in FIG. 4, the clutch 46 includes a coil housing 91 which carries a coil 92 and is rotatably secured about the sun gear sleeve 73 by means of a bearing assembly 93. The housing 91 is provided with a radially extending flange member or grounding tang 94 which extends into a recessed portion 94a formed in the housing section 48b to prevent relative rotation of the coil housing 91 within the transfer case housing 48. This facilitates the electrical connection to the coil 92 via a connecting wire 92a. An annular armature plate 95 is axially spaced from and positioned adjacent the coil 92 by a predetermined air gap indicated in FIG. 4 as distance G. The armature plate 95 is secured relative to a pressure plate 96 by means of a plurality of circumferentially spaced screw members 97. A separate spacer sleeve 98 surrounds each screw member 97 and has end portions which are adapted to engage the facing surfaces of the armature plate 95 and the pressure plate 96 in order to establish a predetermined spacing between the plates, while also functioning to maintain the plates in secure parallel relationship. The pressure plate 96 is provided with internal teeth 96a which matingly engage the sun gear teeth 73a and prevent rotation of the pressure plate/armature assembly relative to the sun gear sleeve 73.

An annular reaction plate 99 is positioned between the armature plate 95 and the pressure plate 96. The reaction plate 99 is secured to the sun gear sleeve 73 by snap rings 99a and 99b which are located within grooves formed in the sun gear sleeve on opposite sides of the reaction plate 99. A plurality of alternating friction disc members 101 and 102 are positioned between the reaction plate 99 and the pressure plate 96. The friction discs 101 are provided with an annular external toothed portion which cooperates with the internally formed ring gear teeth on the ring housing 61 to prevent relative rotation between the friction discs 101 and the ring gear housing 61. Similarly, the friction discs 102, which alternate with the friction disc 101, are provided with internal teeth which engage the sun gear teeth 73a formed on the sleeve 73 to prevent relative rotation therebetween.

Normally, the clutch 46 is not energized, and slippage can occur between the friction plates 101 and 102, thereby enabling the ring gear housing 61 (and thus the output shaft 43) and the sun gear sleeve 73 (and thus the front output shaft 44) to rotate relative to one another. When current is supplied to the coil 92, the magnetic field generated thereby urges the armature plate 95 axially toward the coil, thus causing the pressure plate 96 to force the friction discs 101 and 102 toward the reaction plate 99 and against one another This causes the ring gear housing 61 to lock relative to the sun gear sleeve 73.

The present invention incorporates a unique lubrication system for lubricating certain components of the transfer case which are above the normal level of lubricating oil contained in the housing. As shown in FIG. 5, this level is approximately along the line L, such that the lower end of the first output gear 78, and the lower end of the planetary gear differential 42, are immersed in lubricating oil. In particular, a front rib member 110 (shown in FIG. 3) is formed on the upper portion of the housing section 48a and includes an upper end 110a located immediately above the first output gear 78. The rib member 110 extends downwardly and terminates at a point 110b. The front housing section 48a is provided with a dam member 111 which cooperates with the front and side walls of the housing to define a front oil reservoir 112. The reservoir 112 has an aperture 112a formed in the lower end thereof which leads into an area 114 near the front of the bearing assembly 53. Normally, in operation, the front output gear 78 is partially immersed in lubricating oil such that oil is flung upwardly against the rib portion 110a. Oil will then flow down the rib member 110 and into the oil reservoir 112. From this point, oil will flow through the aperture 112a and into the area 114 adjacent the front bearing assembly 53. Oil is prevented from flowing through the bearing assembly by means of an annular ring 53a secured to the bearings. Instead, oil will flow axially along the exterior of the input shaft 41, first lubricating the fluted bearing surfaces 75 then the needle bearing 74, and finally bushing 72 along with some of the components of the planetary gear differential 42.

Similarly, the rear housing section 48b is provided with a rear rib member 115 having a front section 115a locate above the ring gear housing 61. The rib member extends rearwardly and downwardly and terminates at a point 115b. The rear housing section 48b is provided with a dam member 116 which cooperates to define a rear oil reservoir 117 having a passageway 116a in the lower end thereof which leads into an area 118 surrounding the rear shaft. When rotating, the ring gear housing 61, which is partially immersed in lubricating oil, will throw lubricating oil toward the front portion 115a of the rib 115. From this point, oil will flow downwardly along the rib and into the rear reservoir 117. Oil will then flow through the passageway 116a into the area 118 to lubricate the rear bearing assembly 65, the needle bearings 68, and the bushing 72. Oil will leave the area 118 through the bearing assembly 65, and will be caught by a cup-shaped member 119 secured to the ring housing 61. As the area between the cup-shaped member 119 and the circular plate 63 is filled with oil, oil will be forced through a plurality of circumferentially spaced apertures 119a formed in the plate 63 to lubricate the internal components of the planetary gear differential.

Figure 6:
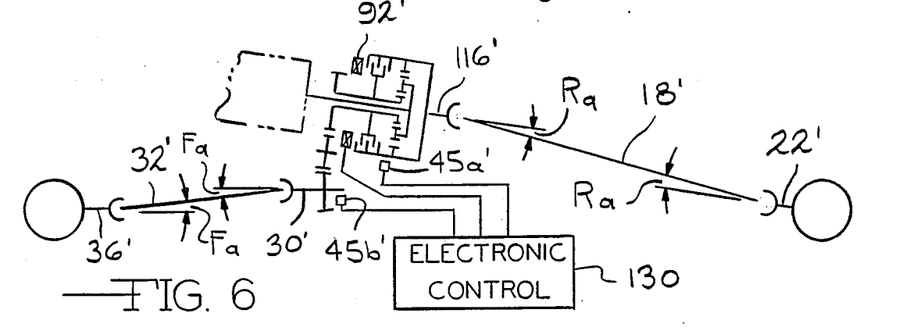
FIG. 6 is a schematic drawing illustrating an alternate embodiment of a four wheel drive system which utilizes the angled relationship of the transfer case output shafts to maintain the angle between the drive shafts and the respective transfer case and differential shafts substantially equal at each end of the associated drive shaft.
Figures 7, 8:
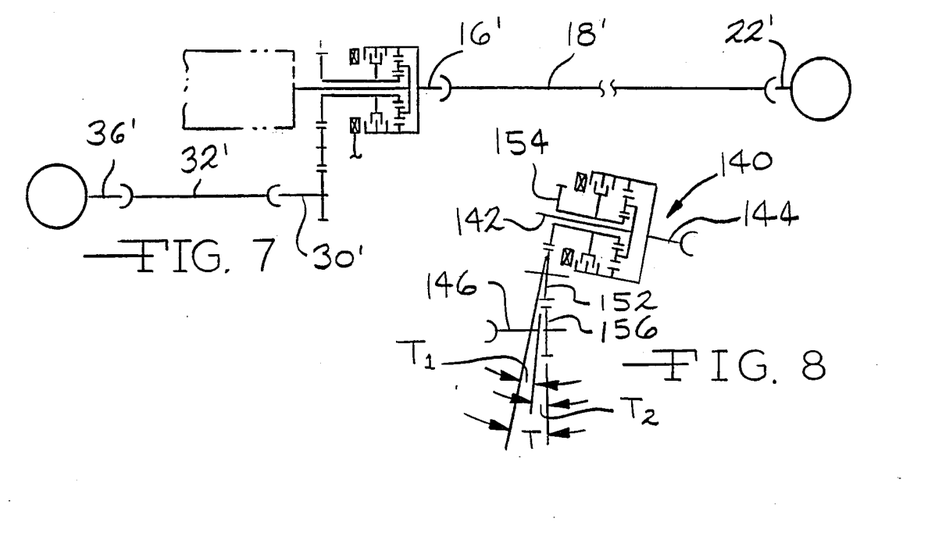
FIG. 7 is a side view of the drive system illustrated in FIG. 6.
FIG. 8 is a schematic drawing of an alternate embodiment of the transfer case of the present invention wherein, in addition to an angled front output gear, an intermediate gear is also angled such that the cumulative angle between a first output gear and the front output gear results in the desired angular relationship between the front and rear output shafts of the transfer case.

Referring now to FIGS. 6 and 7, there is shown an alternate embodiment of a drive system according to the present invention. As discussed previously with respect to the drive system of FIGS. 1 and 2, it was noted that it is preferable to align the front and rear output shafts of the transfer case in substantially straight line relationships with the respective drive shafts and the respective input shafts to the differential units. However, in some instances, such as the example shown in FIG. 6, due to obstructions (not shown) which may be present from other vehicular components, it may not be possible to align the drive train in such a manner. In these instances, it has been found desirable to orient the transfer case output shafts and the respective differential input shafts to equalize the universal joint angles at each end of the associated drive shafts. When this is done, the load on the universal joints at each end of the associated drive shaft will be balanced. As shown in the side view of FIG. 6, a front output shaft 30' is angled relative to a rear output shaft 16'. However, the front output shaft 30' is shown as forming an angle $F_a$ with a *front drive shaft* 32', while a front differential input shaft 36' forms an identical angle $F_a$ with the front drive shaft 32'. Thus, the front drive shaft 32' will be angled downwardly from the transfer case to the front differential. Similarily, in the side view of FIG. 6, the rear output shaft 16 forms an angle $R_a$ with a rear drive shaft 18', while a rear differential input shaft 22' forms an identical angle $R_a$ with the rear drive shaft 18'. Preferably, the angles $F_a$ and $R_a$ are less than four degrees. In the top plan view of FIG. 7, the front shafts 30', 32', and 36', appear in generally straight line relationship, while the rear shafts 6',18' and 22' appear in generally straight line relationship.

Also, it should be noted that FIG. 6 illustrates an electronic control 130, which is connected to receive signals from a rear shaft speed sensor 45a' and a front speed sensor 45b', and is connected generate an activation signal to a clutch coil 92'.

Referring now to FIG. 8, there is shown in schematic form an alternate embodiment of a transfer case 140 according to the present invention. The transfer case as shown in FIG. 8 is essentially identical to the transfer case of FIGS. 3, 4, and 5, and includes an input shaft 142, a rear output shaft 144, and an angled front output shaft 146. However, in FIG. 8, an intermediate gear 152 is mounted for rotation about an axis which is angled an amount T1 with respect to the axis of a first output gear 154. Also, a front output gear 156 is angled an amount T2 with respect to the axis of the intermediate gear 152. Thus, a cross-axised gearing arrangement exists between both the first output gear 154 and the intermediate gear 152 and between the intermediate gear 152 and the front output gear 156. In this arrangement, the total angle T between the rear output shaft and the front output shaft is determined by the total of the two angles T1, T2 shown in FIG. 8.

The transfer case and drive system of the present invention have been illustrated and described in what is considered to represent its preferred embodiment. However, it will be appreciated that the transfer case and drive system can be modified without departing from the spirit or scope of the attached claims.

What is claimed is:

1. A four wheel drive system for a vehicle having front and rear drive wheels and an engine and transmission assembly for providing a supply of output torque, said system comprising:

a torque transfer unit including a torque input shaft for receiving output torque from the vehicle engine and transmission assembly, a front output shaft, a rear output shaft, and means for drivingly connecting said torque input shaft to said front and rear output shafts;

said front output shaft having a rotational axis which is oriented in a non-parallel, non-intersecting relationship with the rotational axis of said rear output shafts;

said rotational axis of said front output shaft and said rotational axis of said rear output shaft cooperating to define skew lines;

a rear differential connected to drive the vehicle rear wheels and having a rear input shaft positioned lower than said rear output shaft of said torque transfer unit;

a rear drive shaft connected between said rear output shaft and said rear input shaft and angled downwardly from said rear output shaft to said rear input shaft;

said rear output shaft and said rear input shaft being oriented such that when the vehicle is loaded with a predetermined weight the angle between said rear drive shaft and said rear output shaft is substantially equal to the angle between said rear drive shaft and said rear input shaft;

a front differential having a front input shaft and connected to drive the vehicle front wheels;

a front drive shaft connected between said front output shaft of said transfer unit said front input shaft of said front differential; and said front output shaft and said front input shaft being oriented such that when the vehicle is loaded with said predetermined weight the angle between said front drive shaft and said front output shaft is substantially equal to the angle between said front drive shaft and said front input shaft.

2. The four wheel drive system according to claim 1 wherein said rear output shaft, said rear drive shaft, and said rear input shaft are all oriented in a generally straight line relationship.

3. The four wheel drive system according to claim 1 wherein said front output shaft, said front drive shaft, and said front input shaft are all oriented in a generally straight line relationship.

4. The four wheel drive system according to claim 3 wherein said front input shaft is positioned lower than said front output shaft.

5. The four wheel drive system according to claim 1 wherein said front and rear output shafts of said torque transfer unit are located in spaced apart parallel planes.

6. The four wheel drive system according to claim 5 wherein said torque input shaft and said rear output shaft are in a generally straight line relationship.

7. The four wheel drive system according to claim 6 wherein said torque transfer unit includes a cross-axised gear assembly for driving said front output shaft.

8. The four wheel drive system according to claim 7 wherein said torque transfer unit includes a differential means for dividing torque between said front and rear output shafts and enabling slippage between said front and rear output shafts.

9. The four wheel drive system according to claim 8 wherein said torque transfer unit includes a clutch means for selectively locking said differential means to prevent slipping between said front and rear output shafts.

10. A four wheel transfer case assembly comprising:
a housing;
an input shaft rotatably supported within said housing;
a rear output shaft rotatably supported within said housing;
a front output shaft rotatably supported within said housing;
differential means for drivingly connecting said input shaft to said front and rear output shafts and dividing torque therebetween;
clutch means for selectively locking said differential means to prevent slipping between said front and rear output shafts;
said input shaft and said rear output shaft being aligned in generally straight line relationship;
said front output shaft having a rotational axis being oriented in a non-parallel, non-intersecting relationship with the rotational axis of said rear output shaft;
said rotational axis of said front output shaft said rotational axis of said rear output shaft cooperating to define skew lines; and
a cross-axised gear arrangement connected between said differential means and said front output shaft for supplying torque to said front output shaft.

11. The four wheel drive transfer case according to claim 10 wherein said front output shaft and said rear output shaft are located in spaced apart parallel planes.

12. The four wheel drive transfer case according to claim 10 wherein said differential means includes a planetary gear differential having a planet gear carrier coupled to said input shaft, a ring gear coupled to said rear output shaft and a sun gear coupled to said front output shaft.

13. The four wheel drive transfer case according to claim 10 including a first output gear connected to receive front output torque from said differential means, a rotatable intermediate gear in meshing engagement with said first output gear, and a front output gear secured to said front output shaft for rotation therewith and in meshing engagement with said intermediate gear.

14. The four wheel drive transfer case according to claim 13 wherein said intermediate gear and said front output gear are in cross-axised relationship.

15. The four wheel drive transfer case according to claim 14 wherein said first output gear and said intermediate gear are in cross-axised relationship.

16. A lubrication system for a four wheel drive transfer case comprising:
a housing;
an input shaft rotatably supported within said housing;
a rear output shaft rotatably supported within said housing;

a sleeve member coaxially and rotatably supported about said input shaft;

a first output gear secured for rotation with said sleeve member;

a differential means for dividing torque from said input shaft between said front and rear output shafts, said differential means having three interconnected components including a first component connected to said input shaft, a second component connected to said rear output shaft, and a third component connected to said sleeve member;

a front output shaft rotatably supported within said housing;

means for drivingly connecting said first output gear to said front output shaft;

said housing containing a supply of lubricating oil at least partially immersing said first output gear;

said first output gear located adjacent an upper front inside surface of said housing;

a front oil reservoir located above said input shaft;

said housing including a rib member located on said upper inside surface of said housing for receiving lubricating oil thrown against said rib by said first output gear as said first output gear is rotated, said rib member angled downwardly toward said front oil reservoir for directing lubricating oil into said front oil reservoir; and means for directing lubricating oil from said front reservoir through said sleeve member and into said differential means.

17. The lubrication system according to claim 16 including, a rotating annular means coaxial with said rear output shaft; said annular means having an upper portion located adjacent an upper rear inside surface portion of said housing and having a lower portion at least partially immersed in said lubricating oil; a rear oil reservoir located above said rear output reservoir; said housing including a rear rib member located on said upper rear inside surface portion of said housing for receiving lubricating oil thrown against said rear rib member by said rotating annular means, said rear rib member angled downwardly toward said rear oil reservoir for directing lubricating oil into said rear oil reservoir; and means for directing lubricating oil from said rear reservoir to at least one component rotatable relative to said rear output shaft.

18. The lubrication system according to claim 16 wherein said differential means is a planetary gear differential wherein said three components include a ring gear, a planet gear carrier, and a sun gear; said ring gear provided with an annular radially inwardly facing opening to define a chamber for receiving and retaining lubricating oil when said ring gear is rotated, said ring gear provided with means for directing oil from said chamber into interior portions of said planetary gear differential; and means for directing lubricating oil into said chamber.

19. A lubrication system for a vehicle transmission comprising;

a housing;

an input shaft rotatably supported within said housing;

an output shaft rotatably supported within said housing;

a planetary gear differential connected between said input shaft and said output shaft for controlling torque transmitted to said output shaft;

said planetary gear differential having three components including a ring gear, a planet gear carrier, and a sun gear;

said ring gear provided with an annular cup-shaped portion having an annular radially inwardly facing opening to define a chamber for receiving and retaining lubricating oil when said ring gear is rotated, said ring gear provided with means for directing oil from said chamber into interior portions of said planetary gear differential; and means for directing lubricating oil into said chamber.

* * * * *

UNITED STATES PATENT AND TRADEMARK OFFICE
CERTIFICATE OF CORRECTION

PATENT NO. : 4,860,612

DATED : August 29, 1989

INVENTOR(S) : Wesley M. Dick and David C. Reuter

It is certified that error appears in the above-identified patent and that said Letters Patent is hereby corrected as shown below:

Column 10, line 34, after "shaft" add -- and --.

Signed and Sealed this

Fourteenth Day of August, 1990

Attest:

HARRY F. MANBECK, JR.

*Attesting Officer*      *Commissioner of Patents and Trademarks*